(12) United States Patent
Faler et al.

(10) Patent No.: US 8,541,064 B2
(45) Date of Patent: *Sep. 24, 2013

(54) METHODS AND SYSTEMS FOR PRODUCING THERMOPLASTIC COATED OPTICAL FIBERS

(75) Inventors: James Henry Faler, Wilmington, NC (US); Bruce Warren Reding, Wilmington, NC (US); Bradley Kent Shepard, Wilmington, NC (US); David Andrew Tucker, Wilmington, NC (US)

(73) Assignee: Corning Incorporated, Corning, NY (US)

(*) Notice: Subject to any disclaimer, the term of this patent is extended or adjusted under 35 U.S.C. 154(b) by 960 days.

This patent is subject to a terminal disclaimer.

(21) Appl. No.: 12/469,316

(22) Filed: May 20, 2009

(65) Prior Publication Data

US 2009/0297722 A1    Dec. 3, 2009

Related U.S. Application Data

(60) Provisional application No. 61/130,248, filed on May 29, 2008.

(51) Int. Cl.
*B29D 11/00* (2006.01)
(52) U.S. Cl.
USPC ..... 427/508; 427/162; 427/163.1; 427/163.2; 427/164; 427/169; 427/512

(58) Field of Classification Search
USPC .................. 427/162, 163.1, 163.2, 164, 169, 427/508, 512
See application file for complete search history.

(56) References Cited

U.S. PATENT DOCUMENTS

| 6,565,775 B2 * | 5/2003 | Dubois et al. ............. 264/1.24 |
| 2008/0193090 A1 * | 8/2008 | Riddett et al. ............. 385/106 |

FOREIGN PATENT DOCUMENTS

| EP | 1376181 | 1/2004 |
| JP | 59-146948 | 8/1984 |
| JP | 62-3037 | 1/1987 |
| WO | 2008/066661 | 6/2008 |
| WO | 2009/070232 | 6/2009 |
| WO | 2009/070253 | 6/2009 |
| WO | 2009/085114 | 7/2009 |

* cited by examiner

*Primary Examiner* — Daniel McNally
*Assistant Examiner* — Margaret Squalls
(74) *Attorney, Agent, or Firm* — Robert L. Carlson

(57) ABSTRACT

A method for producing a coated optical fiber may include drawing an optical fiber from a draw furnace along a first vertical pathway. The optical fiber may then be routed through at least one fluid bearing thereby redirecting the optical fiber along a second vertical pathway. Thereafter, a thermoplastic coating may be applied to the optical fiber with a thermoplastic coating system. The optical fiber may then be wound onto a fiber storage spool with a fiber take-up system. The fiber take-up system may be space apart from the thermoplastic coating system such that the thermoplastic coating may be cooled before the optical fiber is wound onto the fiber storage spool.

16 Claims, 5 Drawing Sheets

METHODS AND SYSTEMS FOR PRODUCING THERMOPLASTIC COATED OPTICAL FIBERS

CROSS-REFERENCE TO RELATED APPLICATIONS

This application claims the benefit of, and priority to U.S. Provisional Patent Application No. 61/130,248 filed on May 29, 2008 entitled, "Methods and Systems for Producing Thermoplastic Coated Optical Fibers", the content of which is relied upon and incorporated herein by reference in its entirety.

FIELD OF THE INVENTION

The present invention relates to methods and systems for producing coated optical fibers and, more specifically, to methods and systems for coating optical fibers with thermoplastic.

BACKGROUND

Conventional techniques and manufacturing processes for producing optical fibers generally include drawing optical fiber downward from a draw furnace and along a linear pathway through multiple stages of production in an optical fiber draw tower. Accordingly, fiber production systems are generally oriented along a vertical pathway. Such systems present a significant impediment to improving and modifying the optical fiber manufacturing process. For example, the equipment associated with the vertically linear production of optical fiber is generally aligned in a top to bottom fashion thereby making it difficult to add components to the system or modify existing components without adding height to the overall system. In some cases, such as when the existing production system is at or near the ceiling of the existing facility, the addition of equipment and/or components to the linear production system necessitates additional construction to add height to the facility in order to accommodate the additional equipment and/or components. Further, interchanging and/or servicing vertically linear optical fiber production equipment may require the use of additional equipment such as scaffolds, lifts and the like. Such impediments result in significant additional costs when modifying, updating, and or repairing optical fiber production systems and facilities.

After being drawn from the draw furnace, the optical fibers are generally coated with a UV-curable material, such as an acrylate material, to protect the fiber and improve the optical characteristics of the fiber. Some optical fibers may have multiple coatings applied to the optical fiber. For instance, the optical fiber may have a primary coating disposed immediately adjacent the glass fiber while a secondary coating is applied around the primary coating. Each coating may serve a different function. For example, the primary coating may be used to improve the optical properties of the optical fiber while the secondary coating may be used to improve the durability of the optical fiber.

SUMMARY

In one embodiment, a method for producing a coated optical fiber may include drawing an optical fiber from a draw furnace along a first vertical pathway. The optical fiber may then be routed through at least one fluid bearing thereby redirecting the optical fiber along a second vertical pathway. Thereafter, a thermoplastic coating may be applied to the optical fiber with a thermoplastic coating system. The optical fiber may then be wound onto a fiber storage spool with a fiber take-up system. The fiber take-up system may be spaced apart from the thermoplastic coating system such that the thermoplastic coating may be cooled before the optical fiber is wound onto the fiber storage spool.

In another embodiment, a system for producing a coated optical fiber may include a draw furnace, at least one fluid bearing, a pulley, a thermoplastic coating system and a fiber take-up system. The at least one fluid bearing may be positioned below an outlet of the draw furnace such that the optical fiber drawn from the draw furnace is directed along a first vertical pathway and into the at least one fluid bearing wherein the at least one fluid bearing redirects the optical fiber along a second vertical pathway. The pulley may be positioned along the second vertical pathway such that the pulley redirects the optical fiber to a third vertical pathway and into a thermoplastic coating system. The fiber take-up system may be positioned along the third vertical pathway such that, after the optical fiber is coated, the optical fiber is directed into the fiber take-up system and wound onto a fiber storage spool. The fiber take-up system may be spaced from the thermoplastic coating system such that the thermoplastic coating cools before the optical fiber is wound onto the fiber storage spool.

In yet another embodiment, a system for producing a coated optical fiber may include a draw furnace, at least one fluid bearing, a thermoplastic coating system, a UV-curable coating system, an irradiator and a fiber take-up system. The at least one fluid bearing may be positioned below an outlet of the draw furnace such that the optical fiber drawn from the draw furnace is directed along a first vertical pathway and into the at least one fluid bearing wherein the at least one fluid bearing redirects the optical fiber along a second vertical pathway. The UV-curable coating system may be positioned along the second vertical pathway such that the optical fiber is coated with a UV-curable coating along the second vertical pathway. The irradiator may be positioned along the second vertical pathway such that, after the optical fiber is coated with the UV-curable coating, the UV-curable coating is cured in the irradiator. The thermoplastic coating system may be positioned along the second vertical pathway such that, after the UV-curable coating is applied to the optical fiber, the optical fiber is coated with a thermoplastic coating along the second vertical pathway. The fiber take-up system may be positioned along the second vertical pathway such that, after the optical fiber is coated, the optical fiber is directed into the fiber take-up system and wound onto a fiber storage spool. The fiber take-up system may be spaced from the thermoplastic coating system such that the thermoplastic coating cools before the optical fiber is wound onto the fiber storage spool.

Additional features and advantages of the invention will be set forth in the detailed description which follows, and in part will be readily apparent to those skilled in the art from that description or recognized by practicing the invention as described herein, including the detailed description which follows, the claims, as well as the appended drawings. It is to be understood that both the foregoing general description and the following detailed description present embodiments of the invention, and are intended to provide an overview or framework for understanding the nature and character of the invention as it is claimed.

BRIEF DESCRIPTION OF THE DRAWINGS

The embodiments set forth in the drawings are illustrative in nature and not intended to be limiting of the invention defined by the claims. Moreover, the following description of the specific illustrative embodiments of the present invention can be understood when read in conjunction with the following drawings where similar structure is indicated with like reference numerals and in which:

DETAILED DESCRIPTION OF THE PREFERRED EMBODIMENTS

Figure 1:
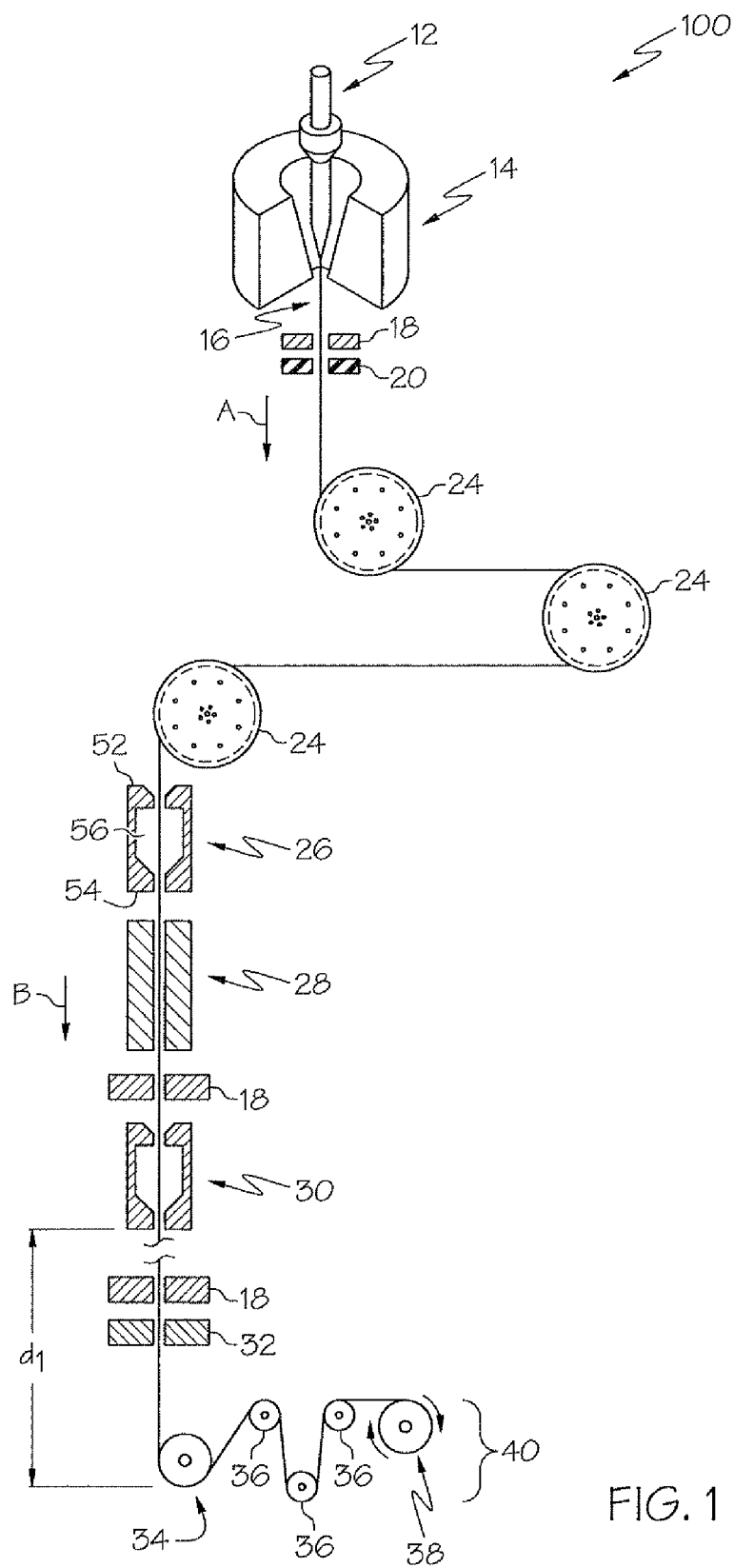
FIG. 1 is a schematic illustration of an optical fiber production system according to one or more embodiments shown and described herein.

The systems and methods described herein relate to the production of optical fiber coated with at least a primary coating and a secondary thermoplastic coating. More specifically, the systems and methods described herein relate to the production of coated optical fibers in which the various components of the system are oriented such that a thermoplastic coating may be applied to the optical fiber at least as a secondary coating. FIG. 1 illustrates one embodiment of a system 100 for producing a coated optical fiber. The system generally comprises a draw furnace oriented along a first vertical pathway, at least one thermoplastic coating system oriented along a different vertical pathway, and at least one fluid bearing disposed between the draw furnace and the at least one thermoplastic coating system. Each of these elements will be described in more detail herein.

Figure 2:
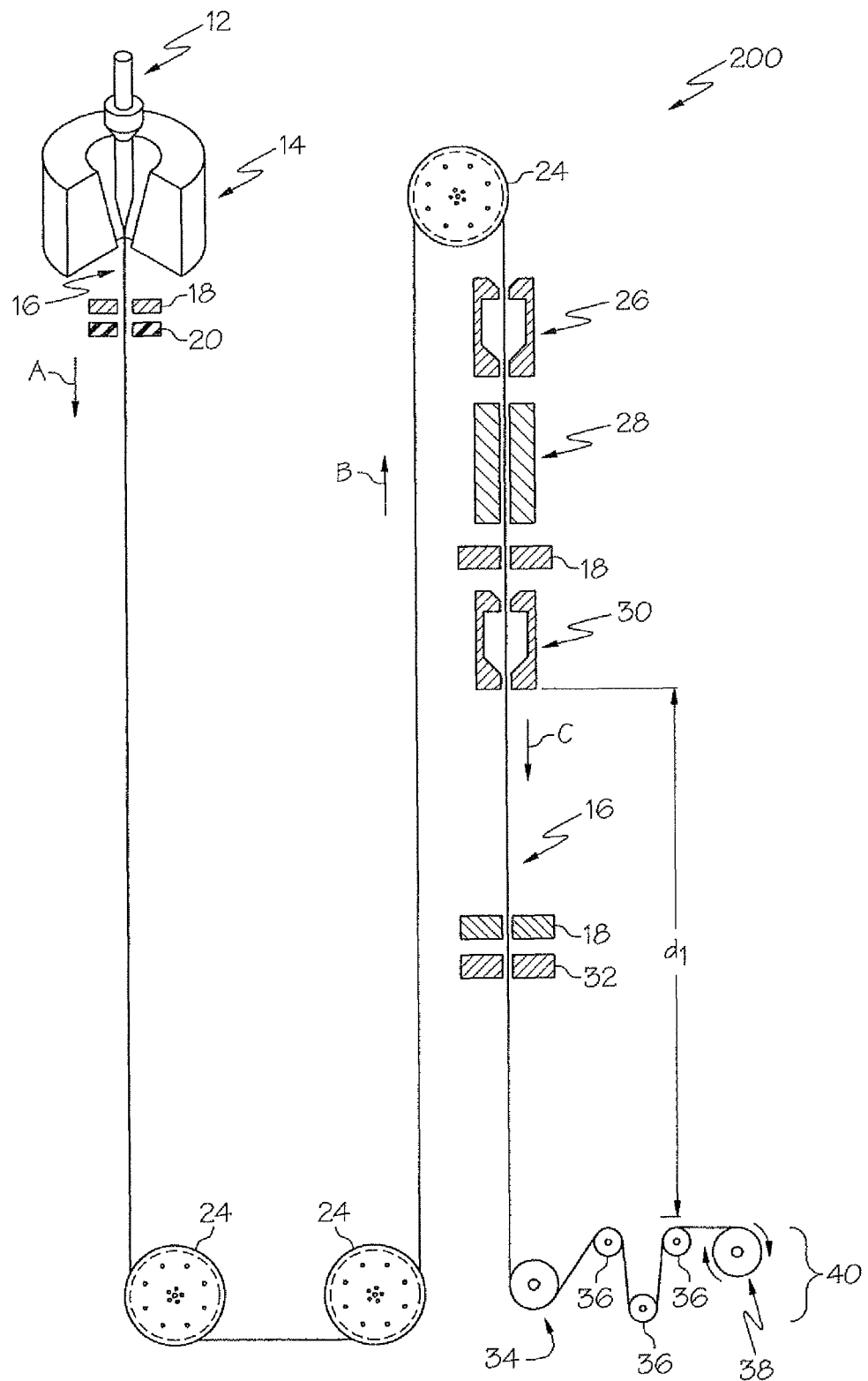
FIG. 2 is a schematic illustration of an optical fiber production system according to one or more embodiments shown and described herein.
Figure 3:
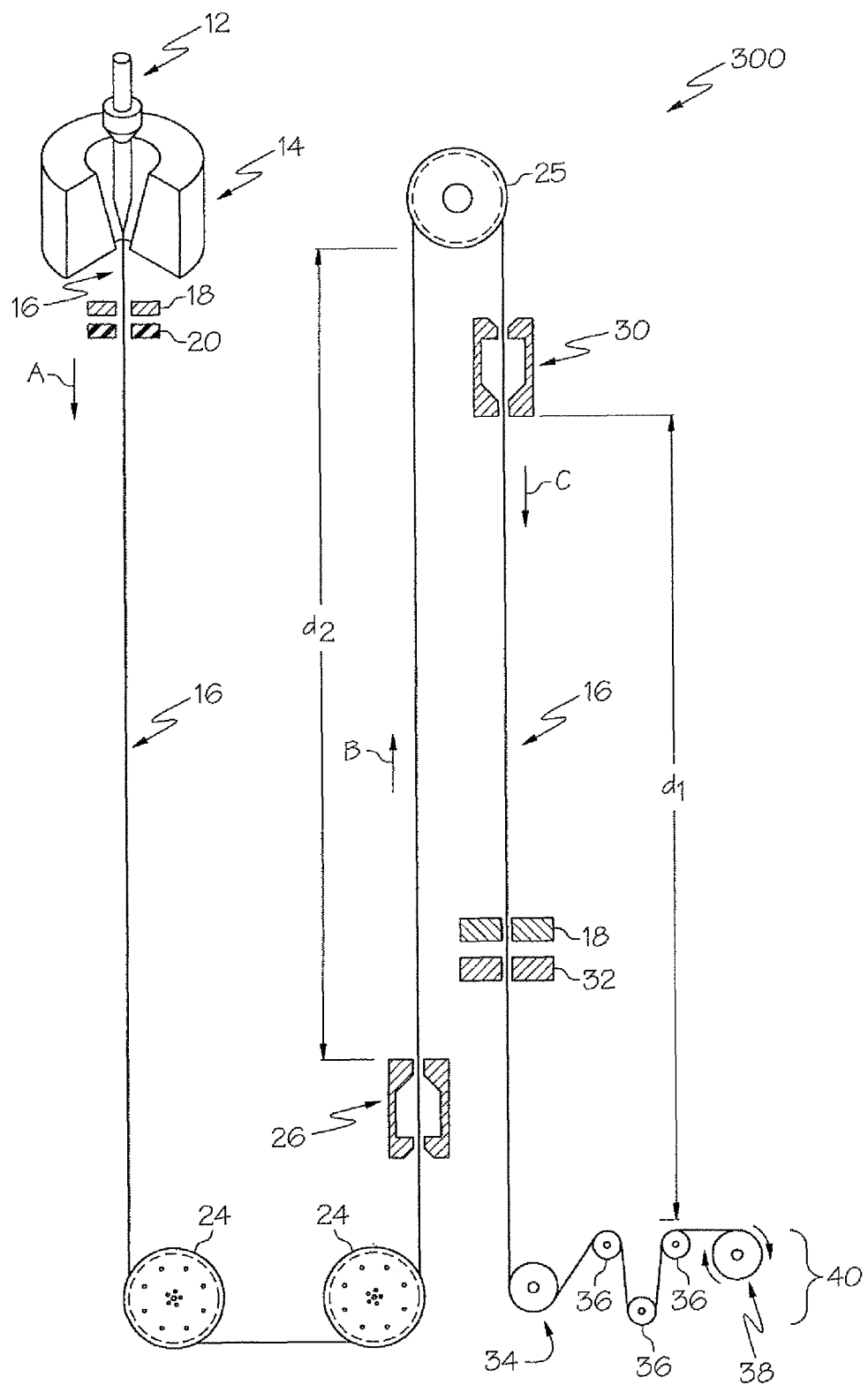
FIG. 3 is a schematic illustration of an optical fiber production system according to one or more embodiments shown and described herein.

Referring to FIGS. 1-3, various embodiments of systems 100, 200, 300 for producing thermoplastic coated optical fiber are illustrated. The systems 100, 200, 300 may generally comprise a draw furnace 14 for heating an optical fiber preform 12 such that an optical fiber 16 may be drawn from the optical fiber preform 12. The preform 12 may comprise glass or any material suitable for the manufacture of optical fibers. The draw furnace 14 may be oriented along a first vertical pathway (A) such that an optical fiber 16 drawn from the optical fiber preform 12 exits the furnace along the first vertical pathway (A) in a downward direction.

After the optical fiber 16 exits the draw furnace 14, the diameter of the optical fiber 16 and the draw tension applied to the optical fiber 16 may be measured with non-contact sensors 18, 20.

As depicted in FIGS. 1-3, after measurement by the non-contact sensors 18, 20, the optical fiber 16 may be redirected from the first vertical pathway (A) to a second vertical pathway (B) wherein the second vertical pathway (B) is parallel with the first vertical pathway (A). In one embodiment, such as the system 100 depicted in FIG. 1, the optical fiber 16 is directed in a generally downward direction along the second vertical pathway (B) and the second vertical pathway (B) may be non-collinear with the first vertical pathway (A). Alternatively, in another embodiment (not shown) the second vertical pathway (B) may be collinear with the first vertical pathway (A) and the optical fiber 16 is directed in a generally downward direction along both the first vertical pathway (A) and the second vertical pathway (B). In other embodiments, such as those shown in FIGS. 2 and 3, after the optical fiber 16 has been redirected to the second vertical pathway (B), the optical fiber 16 may travel in a generally upward direction along the second vertical pathway (B). Further, it should be understood that, in order to facilitate redirecting the optical fiber from the first vertical pathway (A) to the second vertical pathway (B), the optical fiber 16 may be directed along one or more non-vertical pathways between the first vertical pathway (A) and the second vertical pathway (B), as is depicted in FIGS. 1-3.

It should be understood that, prior to receiving a protective coating, the optical fiber 16 is fragile and easily damaged, particularly when the uncoated optical fiber comes into mechanical contact with another solid. Accordingly, to maintain the quality of the optical fiber 16, it is desirable that contact between the optical fiber 16 and any solid surface or component be avoided prior to the optical fiber 16 receiving a protective coating. Therefore, to facilitate redirecting the optical fiber 16 without damaging the optical fiber 16, the optical fiber 16 may be routed through a non-contact mechanism which redirects the optical fiber 16 from the first vertical pathway (A) to the second vertical pathway (B) without mechanically contacting or touching the optical fiber 16. For example, referring to FIGS. 1-3, one or more fluid bearings 24 may be used to redirect the optical fiber 16 along various pathways such that the optical fiber 16 is not subject to mechanical contact until after the optical fiber 16 has been coated. The fluid bearings 24 may be of the type disclosed in U.S. patent application Ser. No. 11/986,764, filed Nov. 26, 2007, titled "METHODS FOR PRODUCING OPTICAL FIBERS", the specification of which is hereby incorporated by reference in it's entirety, although various other types and configurations of fluid bearings may be used to facilitate non-contact redirection of an optical fiber.

Figure 4:
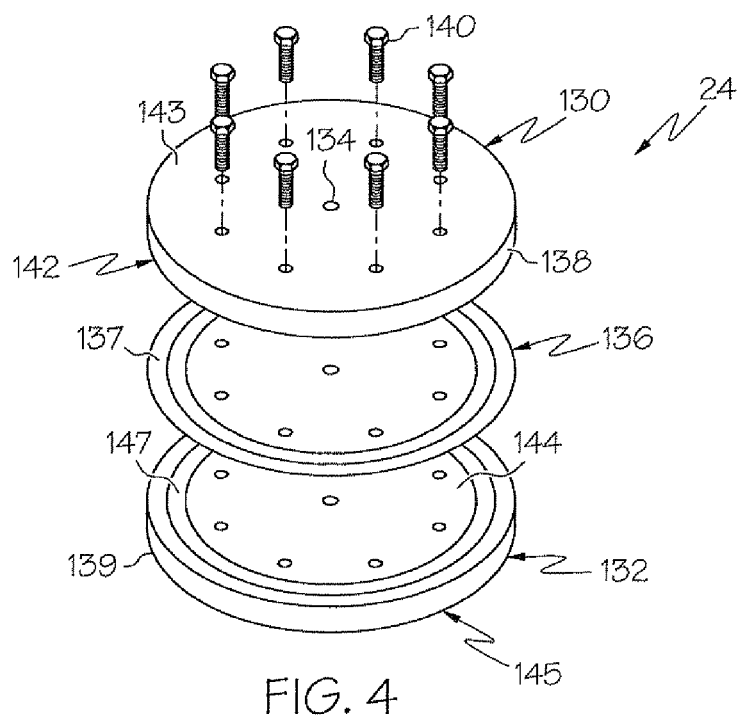
FIG. 4 is an exploded view of a fluid bearing for use in an optical fiber production system according to one or more embodiments shown and described herein.
Figure 5:
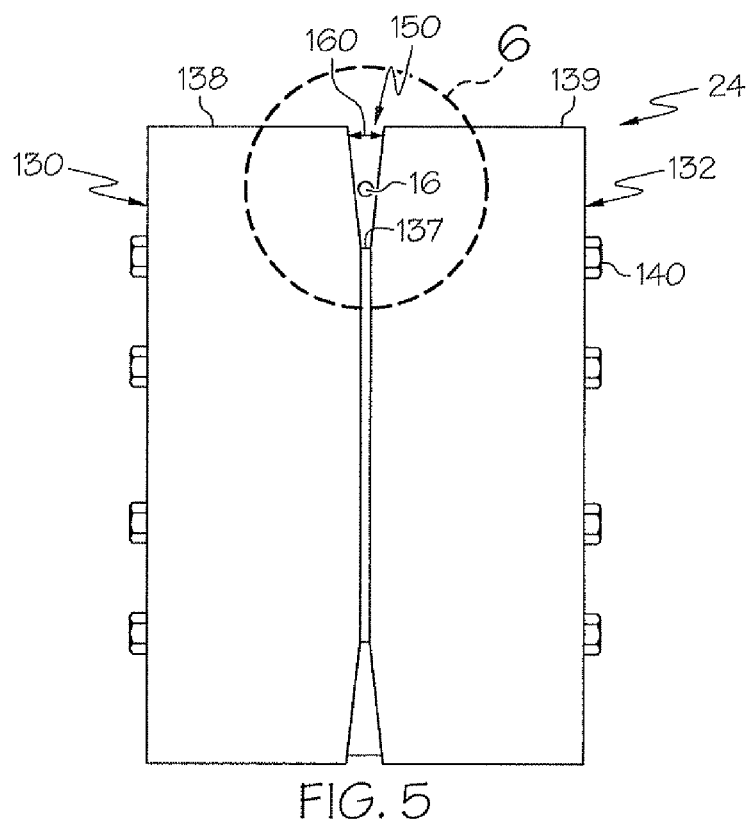
FIG. 5 is a plan side plan view of the fluid bearing for use in an optical fiber production system according to one or more embodiments shown and described herein.
Figure 6:
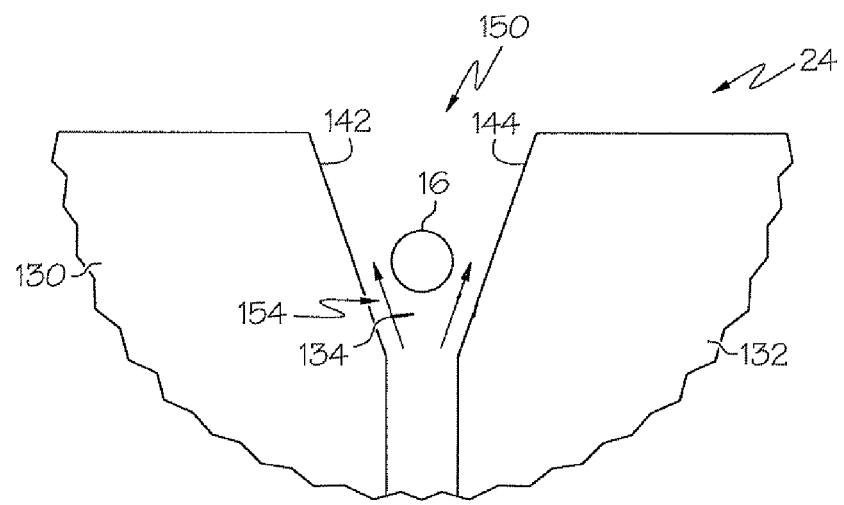
FIG. 6 is an enlarged view of a portion of the fluid bearing for use in an optical fiber production system shown in FIG. 5.

Referring now to FIGS. 4-6, the fluid bearing(s) 24 that may be used with the methods and systems described herein may generally comprise a first plate 130, a second plate 132, an inner member 136 and at least one opening 134 in at least one of the first and second plates. The first plate 130 and the second plate 132 can be made of metal and include an arcuate outer surface 138, 139 and can be positioned on opposite sides of each other. The first plate 130 and the second plate 132 are connected by fasteners (e.g., bolts 140) to link the plates 130, 132 together so that fluid may be passed through the fluid bearing 24. The arcuate outer surfaces 138, 139 of each plate 130, 132 generally lie along the circumference of each of the respective plates 130, 132. The first plate 130 and the second plate 132 each have respective inner 142, 144 and outer surfaces 143, 145, wherein the inner faces 142, 144 of the plates 130, 132 are aligned with each other. A recessed portion 147 extends at least partially around the inner faces 142, 144 of either of the first plate 130 or the second plate 132 to provide a plenum for fluid flow.

The arcuate outer surfaces 138, 139 of the first plate 130 and the second plate 132 are preferably substantially aligned and form a fiber support channel 150 between the outer surfaces 138, 139 of both the first plate 130 and the second plate 132. The fiber support channel 150 is configured to receive an optical fiber 16 so that the optical fiber 16 can travel along this channel without rotation of the fluid bearing 24. At least one opening 134 passes through at least one of the first plate 130 and the second plate 132. As shown in FIG. 4, the opening 134 of the first plate 130 and the second plate 132 allows for fluid (e.g., air, helium or other gas or liquid) to be fed through the fluid bearing 24 so that the fluid can exit the fluid bearing 24 through the fiber support channel 150.

The fluid bearing 24 may include an inner member 136 positioned between the first plate 130 and the second plate 132. This inner member 136 is configured to aid in directing the fluid to the channel between the outer surfaces 138, 139 of the first plate 130 and the second plate 132 such that the fluid exits the fiber support channel 150 having a predetermined flow direction. The inner member 136 rests between the first plate 130 and the second plate 132 to provide a gap there between. In addition, the inner member 136 serves as a sealing portion to provide a substantial contact between the first plate 130 and the second plate 132.

The fiber support channel 150 formed between the outer surfaces 138, 139 of the first plate 130 and the second plate 132 may be tapered where the fluid exits between the first plate 130 and the second plate 132. The width of the opening 160 within the tapered fiber support channel 150 may be variable depending on where the optical fiber 16 is vertically positioned in the fiber support channel 150. Preferably, the opening 160 which forms the tapered fiber support channel 150 is configured so that, for the particular draw tensions and draw speeds employed and flow rates of the fluid through the opening 160, the optical fiber 16 is maintained in a section of the fiber support channel 150 which is less than 500 μm wide, more preferably less than 400 μm wide, even more preferably less than 300 μm wide for an optical fiber having a typical outer diameter of 125 μm. Thus the optical fiber 16 is preferably retained within a region of the fiber support channel 150 which is between 1 and 2 times the diameter of the optical fiber, more preferably between 1 and 1.75 times the diameter, and most preferably between 1 and 1.5 times the diameter of the optical fiber.

Referring now to FIG. 6, an enlarged view of a portion of FIG. 5 is shown to better illustrate the functionality of the fluid bearing 24. FIG. 6 depicts the fiber support channel 150 having a region of fluid cushion 154 that contacts the optical fiber 16 as it is transported across the fluid bearing 24. The fluid cushion 154 prevents the optical fiber 16 from mechanically contacting the components of the fluid bearing 24. As depicted in FIG. 6, fluid 154 (e.g. air) may exit the fiber support channel 150 from within the fluid bearing 24 and around the optical fiber 16 thereby providing the region of fluid cushion 154 which the optical fiber 16 contacts. Fluid pressure may be optimized such that the fiber 16 is positioned within the fiber support channel 150 formed between the first plate 130 and the second plate 132 of the fluid bearing 24. Particularly, the fluid 154 exiting the fluid bearing 24 through the fiber support channel 150 can have a constant fluid flow rate which can maintain or support the optical fiber 16 at a certain position within the fiber support channel 150. The hydrostatic pressure creates a region of fluid cushion 154 as a result of the pressure differential between the fiber and the plates 130, 132. A high enough fluid pressure is provided to the fiber support channel 150 to support the optical fiber 16 and maintain the optical fiber 16 at a desired location within the fiber support channel 150 as the optical fiber 16 moves through the fluid bearing assembly 116. Accordingly, the fluid bearing 24 facilitates redirecting the optical fiber 16 without mechanically contacting the optical fiber 16.

While specific reference has been made herein to the use of fluid bearings for redirecting the optical fiber 16 from a first vertical pathway (A) to a second vertical pathway (B), it should be understood that other devices suitable for redirecting an optical fiber without damaging the optical fiber may be used in place of a fluid bearing and, unless otherwise indicated, no particular limitation is intended with respect to the manner or apparatus used to redirect the optical fiber 16 from the first vertical pathway (A) to the second vertical pathway (B).

Referring again to FIGS. 1-3, the systems 100, 200, 300 for producing coated optical fibers may comprise a plurality of fluid bearings 24 to redirect the optical fiber 16 from the first vertical pathway (A) to the second vertical pathway (B). For example, as shown in FIG. 1, three fluid bearings 24 are used to redirect the optical fiber 16 from the first pathway (A) to the second vertical pathway (B) while two fluid bearings are used to redirect the optical fiber from the first vertical pathway (A) to the second vertical pathway (B) in the embodiments of the system shown in FIGS. 2-3. When more than one fluid bearing is used to redirect the optical fiber from the first vertical pathway (A) to the second vertical pathway (B), it should be understood that the optical fiber 16 may be redirected along one or more intermediate pathways between the first vertical pathway (A) and the second vertical pathway (B) and that the intermediate pathways may be of any orientation with respect to the first vertical pathway (A) and the second vertical pathway (B), as is generally depicted in FIGS. 1-3. However, it should be understood that a single fluid bearing 24 may also be used to redirect the optical fiber 16 from the first vertical pathway (A) to the second vertical pathway (B).

Further, it will be understood that, while the fluid bearings 24 depicted in FIGS. 1-3 function to redirect the optical fiber 16 from one pathway to another, the fluid bearings 24 may also operate as a cooling mechanism for cooling the optical fiber 16 after the optical fiber 16 exits the draw furnace 14. More specifically, the fluid cushion and associated fluid stream that supports the optical fiber 16 in the fluid bearing 24 may also serve to carry heat away from the optical fiber 16 thereby cooling the optical fiber 16. For example, the optical fiber 16 may be cooled to a temperature of about 20° C. to about 200° C. after exiting the fluid bearings 24. In another embodiment, the fluid bearings 24 may work in conjunction with a cooling mechanism (not shown) to cool the optical fiber 16. Cooling of the optical fiber 16 may also be facilitated by spacing the primary coating system 26 apart from the draw furnace 14 such that the optical fiber 16 is also subject to air cooling in addition to any cooling provided by the fluid bearings 24.

The application of a primary coating and a secondary thermoplastic coating to the optical fiber will now be described in more detail with specific reference to the systems 100, 200, 300 shown in FIGS. 1-3.

Referring now to one embodiment of a system 100 for producing an optical fiber with a thermoplastic coating shown in FIG. 1, after the optical fiber 16 is redirected from the first vertical pathway (A) to the second vertical pathway (B), the optical fiber 16 is passed through a primary coating system 26 where a primary coating is applied to the optical fiber 16 along the second vertical pathway (B). In the embodiment of the system 100 shown in FIG. 1 the primary coating system 26 may be configured to apply a UV-curable primary coating to the optical fiber such as a UV-curable acrylate coating. When the primary coating system 26 is configured to apply a UV-curable primary coating to the optical fiber 16, the primary coating system 26 may comprise a guide die 52 having a first diameter and a sizing die 54 having a second, smaller diameter. Disposed between the guide die 52 and the sizing die 54 is a coating chamber 56. The coating chamber 56 is filled with the UV-curable coating material in liquid form. The optical fiber 16 enters the primary coating system 26 through the guide die 52 and passes through the coating chamber 56 where the UV-curable coating material is applied to the surface of the optical fiber 16. The optical fiber 16 then passes through the sizing die 54 where any excess coating material is removed as the optical fiber 16 exits the primary coating system 26 to achieve a coated optical fiber of a specified diameter corresponding to the diameter of the sizing die 54.

While FIG. 1 depicts the primary coating system 26 as having a guide die 52, a coating chamber 56 and sizing die 54 such that the primary coating system 26 is configured to apply a UV-curable primary coating to the optical fiber, it should be understood that the primary coating system 26 may be any suitable coating unit for applying a UV-curable primary coating to an optical fiber as may be presently known in the art or subsequently developed. Further, it should also be understood that the primary coating system 26 may be configured with additional guide and sizing dies such that multiple coatings may be applied to the optical fiber as it is passed through the primary coating system 26. For example, the primary coating system may apply a first UV-curable coating and a second UV-curable coating. The first and second UV-curable coatings may comprise the same material or may comprise different materials to enhance the optical and/or mechanical properties of the resultant coated optical fiber.

Still referring to the embodiment of the system 100 shown in FIG. 1 where the primary coating system 26 is configured to apply a UV-curable primary coating to the optical fiber 16, the system 100 may further comprise an irradiator 28 disposed along the second vertical pathway (B) such that, after the UV-curable coating is applied to the optical fiber 16, the optical fiber 16 with the UV-curable coating passes through the irradiator 28 where the UV-curable coating is cured or hardened. After exiting the irradiator 28, the optical fiber 16 may pass through a non-contact sensor where the diameter of the optical fiber 16 is measured. Thereafter, the optical fiber 16 may be passed through a thermoplastic coating system 30 where a thermoplastic secondary coating is applied to the optical fiber 16 over the UV-curable primary coating. The thermoplastic coating may comprise polyethylene, polypropylene, fluorinated ethylene polypropylene, nylon, polyvinyl chloride or similar thermoplastic materials. The thermoplastic coating system 30 may include an extrusion die for applying the thermoplastic coating to the optical fiber. However, it will be understood that the thermoplastic coating system may employ various other dies and/or coating systems suitable for applying a thermoplastic coating to the optical fiber 16 as may be currently known or subsequently developed.

Referring now to FIG. 3 where another embodiment of a system 300 for producing thermoplastic coated optical fiber is shown, after the optical fiber 16 is redirected from the first vertical pathway (A) to the second vertical pathway (B), the optical fiber 16 may be passed through a primary coating system 26 where a primary coating is applied to the optical fiber 16 along the second vertical pathway (B). In the embodiment of the system 300 shown in FIG. 3 the primary coating system 26 may be a thermoplastic coating system similar to the thermoplastic coating system 30 discussed hereinabove such that the primary coating is a thermoplastic primary coating applied to the optical fiber 16 as the optical fiber 16 is drawn along the second vertical pathway (B).

Still referring to the embodiment of the system 300 for producing thermoplastic coated optical fiber shown in FIG. 3, the system 300 may further comprise a thermoplastic coating unit 30 disposed along a third vertical pathway (C) which is substantially parallel to the second vertical pathway (B). In order to direct the optical fiber 16 from the second vertical pathway (B) to the third vertical pathway (C), the system 300 may also comprise one or more pulleys 25 or bearings disposed between the primary coating system 26 and the thermoplastic coating unit 30 for redirecting the optical fiber 16 from the second vertical pathway (B) to the third vertical pathway (C). In one embodiment, the pulley 25 is a mechanical pulley which contacts the optical fiber 16. In this embodiment, mechanical contact with the thermoplastic coated optical fiber 16 may be acceptable. In another embodiment (not shown), the pulley 25 may comprise a non-contact mechanism for redirecting the thermoplastic optical fiber such as a fluid bearing. After the optical fiber 16 has been coated with a primary thermoplastic coating with the primary coating system 26, the optical fiber 16 is routed into the pulley 25 where it is redirected to the third vertical pathway (C). After the optical fiber has been redirected to the third vertical pathway (C), the optical fiber may be drawn along the third vertical pathway (C) in a generally downward direction.

After receiving the thermoplastic primary coating along the second vertical pathway (B), the thermoplastic primary coating applied to the optical fiber 16 may have an elevated temperature and, as such, may be soft and susceptible to damage until cooling occurs. Accordingly, to cool the thermoplastic primary coating and thereby prevent damage to the coating in subsequent processing stages, the pulley 25 disposed between the primary coating system 26 and the thermoplastic coating unit 30 may be spaced apart from the primary coating system 26 by a distance d2 thereby permitting the thermoplastic coating to air cool before being contacted by the pulley 25. For example, in one embodiment, the thermoplastic primary coating has a temperature of from about 150° C. to about 325° C. when the optical fiber exits the primary coating system 26. By spacing the pulley 25 apart from the primary coating system 26, the thermoplastic primary coating may be air cooled to a temperature from about 30° C. to about 100° C. so that the thermoplastic primary coating is solidified and less susceptible to damage due to contact with the pulley 25. In another embodiment, in addition to spacing the pulley 25 apart from the primary coating system 26 to facilitate cooling of the thermoplastic primary coating, a cooling mechanism (not shown) may be disposed between the primary coating system 26 and the pulley 25 to assist in cooling the primary thermoplastic coating to the desired temperature range.

After the optical fiber 16 is redirected to the third vertical pathway (C), the optical fiber 15 is passed through the thermoplastic coating unit 30 where a thermoplastic secondary coating is applied to the optical fiber. The thermoplastic coating unit 30 may have a substantially similar configuration as the thermoplastic coating unit 30 discussed hereinabove with respect to FIG. 1.

Referring now to FIG. 2 showing another embodiment of a system 200 for producing thermoplastic coated optical fiber, after the optical fiber 16 is redirected from the first vertical pathway (A) to the second vertical pathway (B), the optical fiber is drawn along the second vertical pathway (B) in a generally upward direction where it is air-cooled. The optical fiber is then routed into one or more additional fluid bearings disposed along the second vertical pathway (B) where it is redirected to a third vertical pathway (C) which is substantially parallel to the second vertical pathway (B). In the embodiment of the system 200 shown in FIG. 2, a single fluid bearing 24 is disposed along the second vertical pathway (B) for redirecting the optical fiber 16 to the third vertical pathway (C). However, it should be understood that a plurality of fluid bearings may be used to redirect the optical fiber from the second vertical pathway (B) to the third vertical pathway (C). After being redirected to the third vertical pathway (C) the optical fiber 16 is drawn along the third vertical pathway (C) in a generally downward direction.

The system 200 may also comprise a primary coating system 26 and a thermoplastic coating unit 30 disposed along the third vertical pathway (C). The primary coating system 26 may be configured to apply either a UV-curable primary coating or a thermoplastic primary coating. When the primary coating system 26 is configured to apply a UV-curable primary coating, as shown in FIG. 2, the system 200 may also comprise an irradiator 28. As discussed hereinabove, the primary coating system 26 may be configured to apply multiple UV-curable coatings to the optical fiber 16 as the optical fiber passes through the primary coating system. After being redirected to the third vertical pathway (C) from the second vertical pathway (B), the optical fiber 16 enters the primary coating system 26 where a UV-curable primary coating is applied to the optical fiber 16. Thereafter, the optical fiber enters irradiator 28 where the UV-curable primary coating is cured or hardened. In one embodiment, after the optical fiber exits the irradiator, the diameter of the optical fiber 16 may be measured with a non-contact sensor 18. The optical fiber 16 may then be passed through a thermoplastic coating system 30 where a thermoplastic secondary coating is applied to the optical fiber 16 over the UV-curable primary coating.

Referring now to FIGS. 1-3, after exiting the thermoplastic coating system 30, the diameter of the coated optical fiber 16 may be measured using a non-contact sensor 18. Thereafter, a non-contact flaw detector 32 may be used to examine the coated optical fiber 16 for damage and/or flaws that may have occurred during the manufacture of the optical fiber 16. It should be understood that, after the optical fiber 16 has been coated, the optical fiber 16 is less susceptible to damage due to mechanical contact.

Still referring to FIGS. 1-3, after examination by the non-contact sensor 18 and flaw detector 32, the optical fiber 16, now coated with a UV-curable or a thermoplastic primary coating and thermoplastic secondary coating, is wound onto a fiber storage spool 38 with a fiber take-up system 40. The fiber take-up system 40 utilizes drawing mechanisms 36 and tensioning pulleys 34 to facilitate winding the optical fiber 16 onto a fiber storage spool 38. The tensioning pulley 34 may provide the necessary tension to the optical fiber 16 as the optical fiber is drawn through the system 100. Accordingly, the fiber take-up system 40 directly contacts optical fiber 16 in order to both wind the optical fiber onto a fiber storage spool 38 as well as to provide the desired tension on the optical fiber 16 as it is drawn through the various stages of the systems 100, 200, 300.

As the optical fiber 16 leaves the thermoplastic coating unit 30, the secondary thermoplastic coating applied to the optical fiber 16 may have an elevated temperature and, as such, the secondary thermoplastic coating may be soft and susceptible to damage through mechanical contact. Accordingly, before the optical fiber 16 can be contacted by the fiber take-up system 40, the secondary thermoplastic coating applied to the optical fiber 16 must be cooled. To facilitate cooling of the secondary thermoplastic coating, the fiber take-up system 40 may be spaced apart from the thermoplastic coating unit 30 by a distance d1 such that the secondary thermoplastic coating is air cooled and solidified before entering the fiber take-up system 40. For example, prior to entering the fiber take-up system 40, the secondary thermoplastic coating may be cooled to a temperature from about 30° C. to about 100° C. so that the secondary thermoplastic coating is not damaged by contact with the fiber take-up system. In another embodiment, in addition to spacing the fiber take-up system from the thermoplastic coating unit 30 to facilitate cooling the secondary thermoplastic coating, a cooling mechanism (not shown) may be disposed between the thermoplastic coating unit 30 and the fiber take-up system 40.

It should now be understood that the methods and systems described herein provide for the manufacture of optical fibers having a thermoplastic primary and/or secondary coating utilizing vertically oriented coating systems. Applying the thermoplastic coatings to the optical fiber may be facilitated, at least in part, through the use of non-contact fluid bearings which permit the optical fiber to be redirected along various pathways without mechanically touching the optical fiber. Accordingly, the potential for damage to the optical fiber as the fiber is being redirected is reduced or eliminated.

Moreover, use of fluid bearing in conjunction with the methods and systems described herein reduces the overall height of the optical fiber production system. More specifically, the methods and systems described herein facilitate optical fiber production systems in which the system extends both vertically and horizontally rather than only vertically thereby providing for a more efficient use of building space in facilities housing the optical fiber production system. Further, having the optical fiber production system extend horizontally rather than vertical significantly reduces the costs of implementing modifications, updates and repairs of the optical fiber production system which, in turn, reduces the cost of manufacturing optical fiber.

It will be apparent to those skilled in the art that various modifications and variations may be made to the present invention without departing from the spirit and scope of the invention. Thus it is intended that the present invention cover the modifications and variations of this invention provided they come within the scope of the appended claims and their equivalents.

What is claimed is:

1. A method for producing a coated optical fiber, the method comprising:
    drawing an optical fiber from a draw furnace along a first vertical pathway;
    routing the optical fiber through at least one first fluid bearing wherein the at least one first fluid bearing redirects the optical fiber along a second vertical pathway, the fluid bearing having a tapered channel therein defined by at least two sidewalls, the fiber being retained between said two sidewalls during said routing step;
    applying a thermoplastic coating to the optical fiber with a thermoplastic coating system; and
    winding the optical fiber onto a fiber storage spool with a fiber take-up system wherein the fiber take up system is spaced apart from the thermoplastic coating system such that the thermoplastic coating may be cooled before the optical fiber is wound onto the fiber storage spool.

2. The method of claim 1 wherein the thermoplastic coating is a secondary coating and the method further comprises applying a primary coating to the optical fiber before the secondary coating is applied to the optical fiber.

3. The method of claim 1 wherein the thermoplastic coating comprises polyethylene, polypropylene, fluorinated ethylene polypropylene, nylon or polyvinyl chloride.

4. The method of claim 1 wherein the thermoplastic coating is cooled to a temperature from about 30° C. to about 100° C. before it is wound onto the fiber storage spool with the fiber take-up system.

5. The method of claim 4 wherein the thermoplastic coating is air-cooled.

6. The method of claim 2 wherein the primary coating comprises a UV-curable coating and the UV-curable coating is cured before the secondary coating is applied to the optical fiber.

7. The method of claim 6 wherein the UV-curable coating comprises a UV-curable acrylate coating.

8. The method of claim 6 wherein the UV-curable coating is cured by passing the optical fiber coated with the UV-curable coating through a UV irradiator.

9. The method of claim 1 wherein the first vertical pathway and the second vertical pathway are collinear.

10. The method of claim 6 wherein:
the method further comprises routing the optical fiber through a second fluid bearing prior to applying the primary coating to the optical fiber thereby redirecting the optical fiber along a third vertical pathway.

11. The method of claim 10 wherein the first vertical pathway, the second vertical pathway, and the third vertical pathway are parallel.

12. The method of claim 1 wherein the thermoplastic coating is a secondary thermoplastic coating and the method further comprises:
applying a primary thermoplastic coating to the optical fiber with a primary thermoplastic coating system before the secondary thermoplastic coating is applied to the optical fiber;
routing the optical fiber through a pulley after the primary thermoplastic coating is applied and before the secondary thermoplastic coating is applied thereby redirecting the optical fiber along a third vertical pathway, wherein the pulley is spaced from the primary thermoplastic coating system such that the primary thermoplastic coating may be cooled before the optical fiber is routed into the pulley.

13. The method of claim 12 wherein the primary thermoplastic coating comprises polyethylene, polypropylene, fluorinated ethylene polypropylene, nylon, or polyvinyl chloride.

14. The method of claim 12 wherein the primary thermoplastic coating applied to the optical fiber is cooled to a temperature from about 30° C. to about 100° C. before the optical fiber is routed through the pulley.

15. The method of claim 14 wherein the primary thermoplastic coating applied to the optical fiber is air cooled.

16. The method of claim 12 wherein the first vertical pathway, the second vertical pathway, and the third vertical pathway are parallel.

* * * * *